Jan. 10, 1950  B. A. GOLKOSKI  2,494,237
FOCUSING CONTROL STOP FOR CAMERAS
Filed May 15, 1946  2 Sheets-Sheet 2
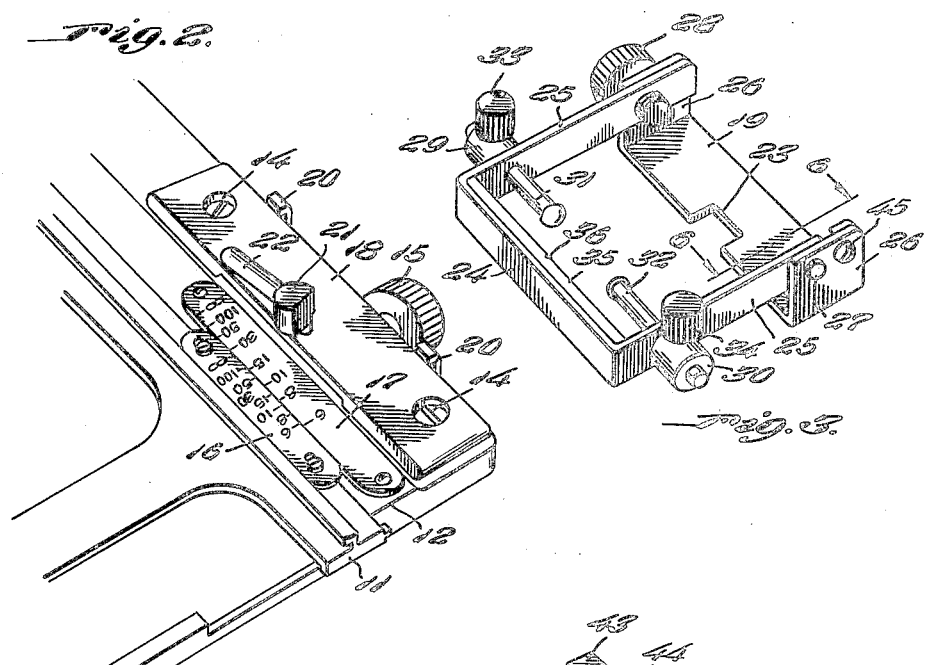
Inventor
Bernard A. Golkoski
By Joseph A. O'Connell
Attorney Patented Jan. 10, 1950

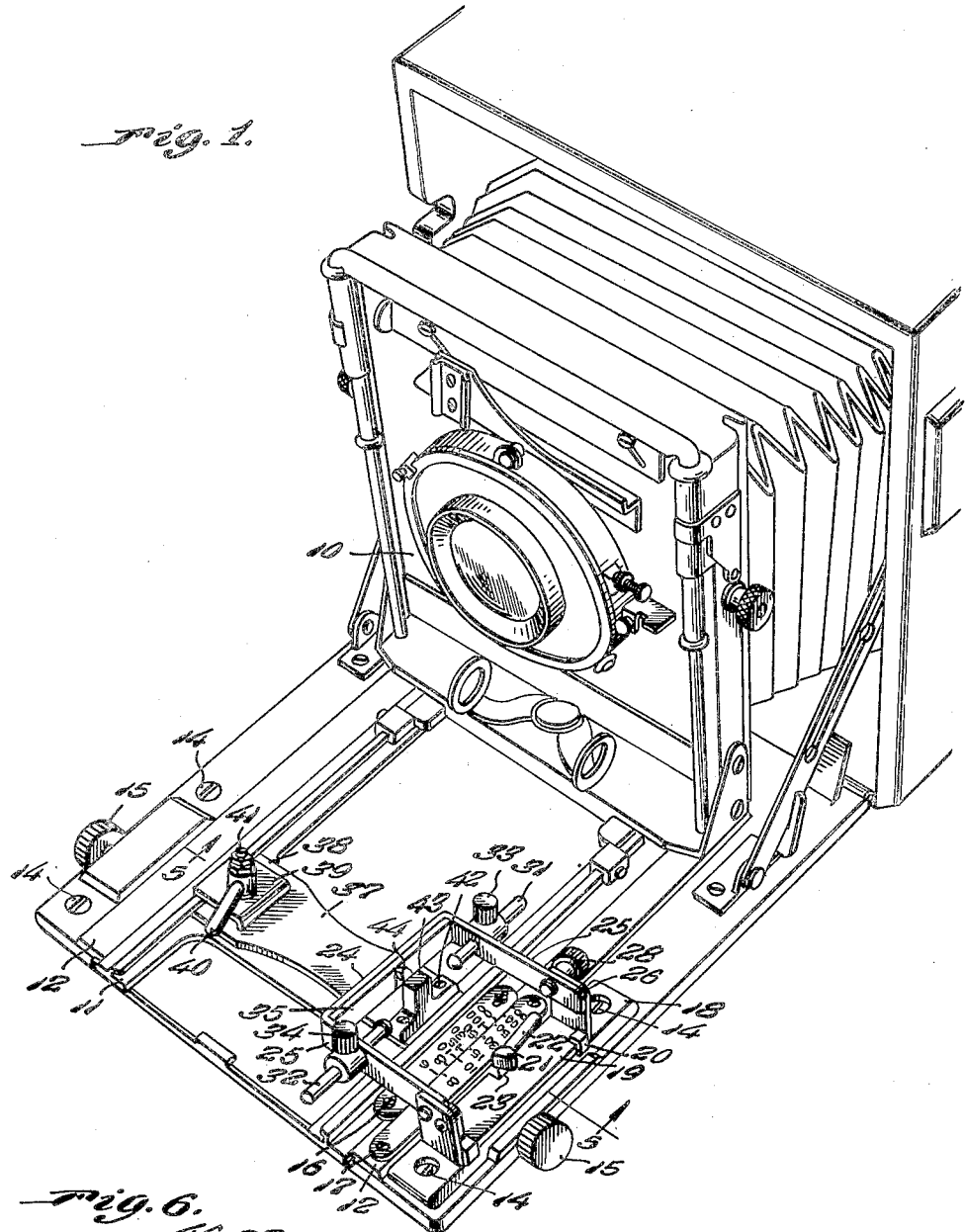
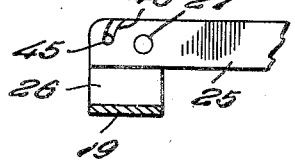

2,494,237

UNITED STATES PATENT OFFICE 2,494,237

FOCUSING CONTROL STOP FOR CAMERAS

Bernard A. Golkoski, Washington, D. C.

Application May 15, 1946, Serial No. 669,753

3 Claims. (Cl. 95—46)

This invention relates to photographic cameras, and particularly to the focusing or distance-setting of the lens.

As is well known to those skilled in the art, the photographing of sporting, stage and news events frequently requires rapid change in the focal or distance-setting in order that the proper object distance may be maintained. Failure to have the proper camera focus or object-distance when shooting the picture invariably results in obtaining a very poor or blurred and indistinct picture.

Cameras now in general used by news photographers do not permit of the required rapid and accurate adjustments of the focal or distance-setting without some positive action on the part of the photographer, such as "scale setting," necessitating the taking of his eye from the view-finder. In following rapidly changing action, as in all sports, and in some news work, the necessity of glancing away from the action even momentarily to correctly focus the camera for object distance, frequently results in the loss of the desired picture. Often then, the operator, rather than risk losing the picture, will rely on his experience and skill and attempt to make the necessary adjustment for distance without reference to the distance or footage scales. This change in the object distance by "judging" or "guess work" more often than not, results in completely spoiling the picture.

In the reflex, or reflected-image type camera, these objections are overcome, inasmuch as the scene may be viewed and focused simultaneously up to the moment of taking the photograph, by means of a mirror-screen combination; however, use of this type of camera is not popular due to the fact that the image is reversed left-for-right, reduced in size, and it is also an inherent disadvantage of this type of camera that the operator must "shoot" or take the picture a split-second ahead of the action actually desired, since time-lag must be allowed so that the mirror can rise out of the way of the focal-plane shutter, in order to permit the latter to begin exposing the plate or film.

An object of this invention is to enable the photographer doing news, sports, stage or other pictures requiring rapid and certain changes of focus together with continuous viewing of the scene while the focal change is being made, to be able to execute such changes with positive, predetermined results, and without having to remove his eye or attention from the action of the subject, at the same time seeing a full-size, unobstructed, unreversed image of the scene through the regular wire-frame view finder. The feature of the invention which accomplishes this object further provides means of taking fullest possible advantage of the so-called hyperfocal distance tables, sometimes also called "zone focusing" or "depth of focus."

Another object of the invention is to enable a photographer to use any lens, such as a new lens or one borrowed on the working scene, immediately and without needing to have installed and calibrated the conventional marked-footage scale.

A further object is to enable the photographer to obtain absolutely accurate pre-setting of the focus for a choice of points or areas of a stage, sports arena, or other scene wherein due to poor lighting conditions a wide lens opening is necessary, in which case the focal adjustment becomes extremely critical. Thus, all "candid" pictures, made without flashlight and of rapidly shifting persons or objects, would be facilitated by use of this device.

Briefly the invention is in the form of an adjustable stop assembly which will effectively co-act with those relatively movable parts of the camera that enter into the focusing or distance-setting operation for indicating and arresting the lens carrier in certain predetermined focal adjustments or distance-settings.

The device of my invention is preferably in the form of an attachment that may be applied to any camera of the bellows focusing type. The attachment requires no particular skill to install. The application of the device is accomplished without altering the camera structure and by the use of an ordinary screw-driver.

The nature of the invention and the manner in which the above and hereinafter stated objects are attained, will be best understood from the following detailed description read with reference to the accompanying drawings in which is illustrated what is presently considered the preferred embodiment of my invention, and wherein:

Figure 1 is a perspective view of a bellows focusing camera showing the application of a device constructed in accordance with the present invention to a camera of this type;

Figure 2 is a fragmentary perspective view showing the relative position on the camera of the footage or distance scales and the attaching plate forming part of my attachment;

Figure 3 is a perspective view of the bracket and stop support forming part of the adjustable stop assembly constituting the attachment;

Figure 4 is a perspective view of a detent-equipped stop and clamp structure forming part of the attachment;

Figure 5 is a detailed sectional view taken substantially on line 5—5 of Figure 1; and Figure 6 is a fragmentary detailed sectional view taken substantially on line 6—6 of Figure 3.

The bellows focusing type camera fragmentarily shown in the drawings for the purpose of illustrating an application of my invention is well known, both as to construction and operation, to those skilled in this art and accordingly only such parts thereof as believed to be necessary to a complete understanding of my invention will be herein specifically referred to and indicated by reference numerals.

In use the camera front, consisting generally of the lens mount 10, is first set in correct position on the camera track 11 and is coordinated in action therewith to move backward and forward in accomplishing focusing or distance-setting of the camera. Camera track 11 rides back and forth in guide rails 12, fastened to the camera bed 13 by means of screws 14. Focusing is accomplished by rotation of either of the knurled knobs 15 which, through the conventional rack and pinion not shown, moves the track 11, thus moving the lens mount 10. In so focusing the camera, setting of the lens mount 10 for distance is ascertained by reference to the footage scales 16, 17, the former being attached to track 11 and the latter attached to guide rail 12, by screws as shown.

As is apparent from the foregoing and as is well known to those skilled in this art, when the lens mount 10 is once set for a determined object distance it cannot accurately be set to a different object distance or focal adjustment without the operator taking his eye from the view finder and referring to the focusing scales.

I combine with the camera an adjustable stop assembly now to be described whereby the photographer is enabled to easily make rapid and accurate focal or distance-setting adjustments according to constantly changing distances without taking his eyes from the view-finder, or making reference to the distance scales, and by the simple natural movement of the focusing mechanism of the camera.

Forming part of my stop assembly is an attaching plate 18 that is removably secured to the camera bed 13 by the simple expediency of utilizing two of the screws 14 that serve to hold the guide rails 12 to the camera bed.

Complementing the plate 18 is a bracket 19 that rests flatly on plate 18 and at one edge engages angular legs 20 provided as shown on plate 18. This bracket is releasably secured in position through the medium of a locking cam 21 that is pivotally mounted on plate 18 and is equipped with a handle 22 to facilitate movement of the cam into and out of locking engagement with bracket 19. To accommodate the pivot for locking cam 21, bracket 19 is formed in one edge thereof with a notch 23.

A substantially U-shaped stop support 24 has the legs 25 thereof pivoted to upstanding ears 26 of bracket 19 through the medium of a stud 27 and a nut and bolt assembly 28. The nut of the assembly 28 is knurled so that it may be readily threaded home on the pivot bolt for releasably locking the stop support 24 in any one of a number of angular positions of adjustment with respect to bracket 19.

The legs 25 of support 24 are provided with aligned apertured bosses 29, 30, which slidably accommodate stop members 31, 32. The stop members 31, 32 are secured at desired positions of adjustment through the medium of finger-type set screws 33, 34 that are threaded through radial openings, in the bosses to bind against the respective stops.

The bight or closed end of the support 24 is provided with an interior facing 35 of relatively hard metal, preferably hardened steel. On the exposed face thereof, facing member 35 is provided with one or more, in the present instance one, groove 36 for a purpose presently made manifest.

As shown in Figure 1, the support 24 is adapted to be swung down into position across the movable camera track 11, and when in this position the stops 31, 32 and the groove 36 cooperate in a manner now to be described with a movable stop and detent assembly.

The just mentioned movable stop and detent assembly comprises a body plate 37 that is adapted to extend across the camera track 11. At one end thereof plate 37 is formed to provide a clamping jaw 38 that co-acts with a clamping jaw 39 to clamp therebetween the adjacent rail of the track 11 to thereby secure the plate 37 and its associated parts at the desired position of adjustment longitudinally of camera track 11.

The jaws 38 and 39 are releasably urged into clamping engagement with the mentioned rail of the track 11 through the medium of a handle-equipped locking cam 40 that is rotatable about a vertical stub shaft 41 rising from the jaw 38 of plate 37.

At the end thereof, remote from the clamp structure just described, plate 37 has secured thereto, either by being integral therewith or by screws 42, what may be termed a movable stop 43.

Stop 43 is arranged to align with the aligned stops 31, 32, and to move with the track 11, into and out of engagement with the last mentioned stops for arresting movement of the track 11 and lens mount 10 when the same are shifted to one of two extreme predetermined positions of adjustment.

Secured to one side of the stop 43 is a spring-biased detent 44 that is adapted to move into and out of engagement with the groove 35 for controlling and indicating movement of the track 11 and lens mount 10 to a predetermined setting or position of focal adjustment intermediate the aforementioned extreme positions of focal or distance-setting adjustments.

Movement of the support 24 to the position shown in Figs. 1 and 3 is limited through the medium of a stop stud 45 projecting inwardly from one ear 26 of bracket 19 and engaging in an arcuate slot 46 provided in the approximate leg 25 of the stop and adjacent to the free end of said leg, and as is clearly shown in Figure 6.

As an example of the use of the adjustable stop assembly as above described, suppose the photographer desires to take shots of a prize-fight. Here the action, at times, is surely to be fast and the participants are generally constantly on the move so that the camera object distances are constantly changing. The operator prepares for the distance conditions by predetermining several proper focal or distance-settings in the following manner. With lens mount 10 having therein a lens of the proper focal length, first set in correct position on track 11 in accordance with the focal distance of the lens, the operator carefully adjusts the locations of the stops to coincide with stated distances, as for example, the stop 43 is adjusted to 10 feet, the stop 32 to 6 feet and the stop 31 to 15 feet. This setting of the stops for predetermined distances is accomplished as follows:

By rotation of either of the focusing knobs 15 the track 11 and consequently lens mount 10 is slid inwardly or outwardly until the medial distance, in the example given, 10 feet, is ascertained by reference to the footage scales 16, 17. The stop support is then swung down to the position shown in Figure 1, after which stop 43 is slid along track 11 until the detent 44 springs into engagement with the groove 36 in the facing plate 35. This engagement will be readily ascertained by the slight clicking noise which results from this engagement. Stop 43 is then secured in this position of adjustment by turning cam 40 to effect a clamping engagement of jaws 38, 39 with the track rail 11.

The operator by manipulation of one of the focusing knobs 15 and by reference to the footage scales 16, 17 then focuses the camera for the far or long distance, in this example, 15 feet in a manner obvious from the foregoing. When this focal distance has been ascertained, stop 31 is located, by reading the same against the footage scales, in the proper position of adjustment and secured in adjusted position by threading home set screw 33.

Ascertainment of the predetermined short distance, 6 feet in this instance, and setting of stop 32 in proper position of adjustment are, as should be now obvious, accomplished in substantially the same manner as the location of the far distance and setting of stop 31 were accomplished, and hence need not be further detailed.

The stops now having been set to correspond with the several distances from the camera that the operator has estimated his object or "Action" will be at various times, while shooting the pictures, all the operator need do to move the lens mount 10 from one of the several distance or focal settings to another as required by the changing distance conditions for obtaining accurate, sharply defined pictures is to rotate either of the focusing knobs 15 in the proper direction. When the lens mount 10 reaches either of the selected extreme distances, i. e. either 6 ft. or 15 ft. this will be readily ascertained by stop 43, engages that stop 31, 32 which is in its path and which will result in arresting further movement in that particular direction. Completion of movement of the lens mount 10 to the selected medial distance is readily ascertained not only by the tendency of that movement to be arrested by engagement of detent 44 with groove 36 but also by the clicking noise which, as above noted, results from this engagement.

By increasing the number of grooves in the face 35 more than a single medial adjustment, that is more than one adjustment intermediate the stops 31, 32, may be provided for. It is also apparent that the structure herein set forth does not interfere in any way with the usual operations of the camera, or with the use of lens of varying focal length. Removal of the stop assembly from the camera when desired may be readily accomplished. The structure also is of such compactness that it may readily and easily be carried in the pocket or in an assessories case. Because of its simplicity, the assembly lends itself readily to mass production at low cost.

While I have herein described what I believe to be a preferred embodiment of my invention, it is nevertheless understood that various changes may be made therein, within the scope of the claims hereto appended.

What I claim is:

1. In a camera of the bellows focusing type and wherein the focusing thereof is accomplished by the backward and forward movement of the camera track riding in guide rails, a footage scale mounted on the guide rails, a footage scale mounted on the track and readable against the first scale for determining focal or distance-setting, aligned stops individually readable against the footage scales and adjustable lengthwise of the guide rails, a stop adjustable lengthwise of the camera track and cooperable with the first mentioned stops for arresting an adjustment movement of said track in either direction when its position at one end of its movement indicates the camera is focused for a predetermined long distance and its position at the other end of its movement indicates the camera is focused for a predetermined short distance, and co-acting means intermediate the mentioned aligned stops and on the mentioned adjustable stop for arresting adjustment movement of the track when its position indicates the camera is focused for a predetermined medial distance.

2. In a camera of the type wherein the focusing thereof is accomplished by the backward and forward movements of the camera track riding in a guide rail provided therefor, stops individually adjustable parallel to the line of travel of said track, a stop adjustable lengthwise of the track and coordinated therewith to move with the track and engage the first mentioned stops for arresting adjustment movement of the track and indicating predetermined long and short focal distances, and co-acting detent means bridging the first mentioned stops and carried by the second mentioned stop for arresting adjustment movement of the track and indicating a predetermined medial focal distance.

3. In a camera of the type wherein the focusing thereof is accomplished by the sliding movement of the camera track in a guide rail provided therefor, a stop adjustable relative to the track and coordinated to move therewith, a bracket adjacent the guide rail, a member pivoted to the bracket and movable into position overlying the track, opposed stops supported by said member and individually adjustable in a plane parallel to the plane of movement of the track, adapted to be disposed one on each side of the track-carried stop for stopping an adjusting movement of the track in either direction, and co-acting means on the just mentioned stop and on the said member for arresting and indicating an intermediate position in the adjusting movement of the track.

BERNARD A. GOLKOSKI.

REFERENCES CITED

The following references are of record in the file of this patent:

UNITED STATES PATENTS

| Number | Name | Date |
|---|---|---|
| 937,156 | Kroedel | Oct. 19, 1909 |
| 1,029,270 | Bornman | June 11, 1912 |
| 1,034,045 | Topliff et al. | July 30, 1912 |
| 1,127,870 | Drake | Feb. 9, 1915 |
| 1,143,782 | Riddell et al. | June 22, 1915 |
| 1,662,427 | Kroedel et al. | Mar. 13, 1928 |
| 1,730,956 | Tierney | Oct. 8, 1929 |
| 2,196,097 | Brown | Apr. 2, 1940 |